United States Patent [19]

Blumenthal

[11] Patent Number: 5,350,192
[45] Date of Patent: Sep. 27, 1994

[54] INFLATOR ASSEMBLY

[75] Inventor: Jack L. Blumenthal, Los Angeles, Calif.

[73] Assignee: TRW Vehicle Safety Systems Inc., Lyndhurst, Ohio

[21] Appl. No.: 105,296

[22] Filed: Aug. 11, 1993

[51] Int. Cl.$^5$ .............................. B60R 21/26
[52] U.S. Cl. .................... 280/737; 280/741; 222/5
[58] Field of Search ............ 280/737, 741, 736; 222/5, 3; 102/530, 531

[56] References Cited

U.S. PATENT DOCUMENTS

| | | | |
|---|---|---|---|
| 3,773,353 | 11/1973 | Trowbridge et al. | 280/737 |
| 3,774,807 | 11/1973 | Keathley et al. | 222/5 |
| 3,806,153 | 4/1974 | Johnson | 222/5 X |
| 3,829,124 | 8/1974 | Charns et al. | 280/737 |
| 5,033,772 | 7/1991 | Frantom et al. | 280/741 |
| 5,060,974 | 10/1991 | Hamilton et al. | 280/736 |
| 5,076,607 | 12/1991 | Woods et al. | 280/737 |
| 5,131,680 | 7/1992 | Coultas et al. | 280/737 |
| 5,213,362 | 5/1993 | Coultas | 280/741 X |
| 5,230,531 | 7/1993 | Hamilton et al. | 280/737 |
| 5,242,194 | 9/1993 | Popek | 280/737 |
| 5,273,312 | 12/1993 | Coultas et al. | 280/737 |

FOREIGN PATENT DOCUMENTS 2120277 11/1972 Fed. Rep. of Germany ...... 280/737
4231356 4/1993 Fed. Rep. of Germany .

*Primary Examiner*—Margaret A. Focarino
*Assistant Examiner*—Christopher P. Ellis
*Attorney, Agent, or Firm*—Tarolli, Sundheim & Covell

[57] ABSTRACT

An inflator assembly (10) comprises a break away wall portion (58) that partially defines a storage chamber (18) for storing gas which is releasable to inflate a vehicle occupant restraint (12). A first ignitable material, when ignited, produces first combustion products to pressurize and supplement the stored gas. A second ignitable material (122), when ignited, produces second combustion products to ignite the first ignitable material. A movable container (104) contains the second ignitable material (122). The movable container (104) is propelled toward the break away wall portion (58) to penetrate and break away the break away wall portion and then to carry away the break away wall portion across the storage chamber (18) when the second ignitable material (122) is burning.

15 Claims, 3 Drawing Sheets

INFLATOR ASSEMBLY

FIELD OF THE INVENTION

The present invention relates to an inflator assembly for inflating an inflatable vehicle occupant restraint, such as an air bag.

BACKGROUND OF THE INVENTION

A typical inflator assembly includes a rupturable burst disk which, when ruptured, releases a flow of gas from a container in which gas is stored to an air bag to inflate the air bag. The burst disk is ruptured in response to a vehicle collision. In known inflator assemblies which include a rupturable burst disk, the opening created by the ruptured burst disk is a factor in determining the rate of gas flow into the air bag. It is important, therefore, to have the burst disk reliably rupture to create an opening with an effective flow area in a predetermined range of areas.

A known inflator assembly for inflating an inflatable vehicle occupant restraint, such as an air bag, is disclosed in U.S. Pat. No. 5,131,680. An inflator assembly disclosed in the '680 patent includes a container which stores gas under pressure for inflating the vehicle occupant restraint. The inflator assembly further includes a body of pyrotechnic material disposed within the container. The inflator assembly also includes an actuatable igniter assembly for, when actuated, igniting the body of pyrotechnic material. The igniter assembly includes an ignition material which rapidly burns at a relatively high temperature to generate heat and flame which in turn initiates burning the body of pyrotechnic material. As the body of pyrotechnic material burns, flame and hot combustion products emitted by the body of pyrotechnic material pressurize and supplement the stored gas.

The inflator assembly disclosed in the '680 patent also includes an actuator assembly which operates in response to vehicle deceleration indicative of a collision. The actuator assembly is operable to actuate the igniter assembly and to rupture a burst disk to release a flow of gas from the container. The actuator assembly includes an ignition material which, when ignited, generates pressure against the head of a piston to move the piston. The moving piston ruptures the burst disk and strikes the igniter assembly to ignite the ignition material of the igniter assembly. The ignition material, in turn, ignites the body of pyrotechnic material within the container.

Another known inflator assembly for inflating an inflatable vehicle occupant restraint, such as an air bag, is disclosed in co-pending U.S. patent application Ser. No. 965,356, filed on Oct. 23, 1992, entitled "Air Bag Inflator," and assigned to the assignee of the present application. An inflator disclosed in the co-pending application includes a source of gas for inflating the occupant restraint. A burst disk is located to block gas flow into the occupant restraint. A piston is provided for rupturing the burst disk. The piston is movable from a retracted position to an extended position to rupture the burst disk. The piston includes (i) a first central portion for puncturing the burst disk and (ii) a second portion for cutting out a portion of the burst disk after the first central portion punctures the burst disk. The cut portion of the burst disk is clamped between the piston and a housing part of the inflator.

Another known inflator assembly for inflating an inflatable vehicle occupant restraint, such as an air bag, is disclosed in co-pending U.S. patent application Ser. No. 947,147, filed on Sep. 18, 1992, entitled "Apparatus for Inflating a Vehicle Occupant Restraint", and assigned to the assignee of the present application. An inflator disclosed in the co-pending application includes a container which holds a combustible mixture of gases which is ignited. The container has an end wall which bursts when a predetermined pressure is reached in the chamber. When the end wall bursts, gas flows into the occupant restraint.

SUMMARY OF THE INVENTION

In accordance with the present invention, an inflator assembly for inflating an inflatable vehicle occupant restraint comprises a source of inflation fluid for inflating the vehicle occupant restraint. Means is provided for directing inflation fluid into the vehicle occupant restraint. A closure is located to block inflation fluid flow through the directing means. The closure includes a predefined break away portion which, when broken away, enables inflation fluid flow through the directing means. A projectile member breaks away the break away portion of the closure to enable inflation fluid flow through the directing means. Means is provided for propelling the projectile member from a first position in which the closure is located to block inflation fluid flow through the directing means to a second position in which the break away portion of the closure is broken away to enable inflation fluid flow through the directing means. The projectile member comprises (i) a mass having kinetic energy when the projectile member is propelled, (ii) a tip for penetrating the break away portion of the closure, and (iii) surface means for engaging the material of the break away portion of the closure as the tip penetrates the break away portion to enable the kinetic energy associated with the mass to break away the break away portion and then to carry away the break away portion thereby to enable inflation fluid flow through the directing means.

In accordance with another aspect of the present invention, an inflator assembly for use in inflating a vehicle occupant restraint comprises means for defining a storage chamber for storing gas which is releasable to inflate the vehicle occupant restraint. The storage chamber is provided also for containing a first ignitable material which produces first combustion products to pressurize and supplement the stored gas. The means includes a break away wall portion. Actuator means is provided for igniting the first ignitable material. The actuator means includes supporting means for supporting a second ignitable material which produces second combustion products to ignite the first ignitable material. The supporting means comprises a movable container in which the second ignitable material is contained. The actuator means further includes moving means for propelling the movable container against the break away wall portion to penetrate and break away the break away wall portion and then to carry away the break away wall portion across the storage chamber when the second ignitable material is burning.

BRIEF DESCRIPTION OF THE DRAWINGS

The foregoing and other features of the present invention will become apparent to those skilled in the art to which the present invention relates from reading the following description with reference to the accompanying drawings, in which.

DESCRIPTION OF PREFERRED EMBODIMENT

Figure 1:
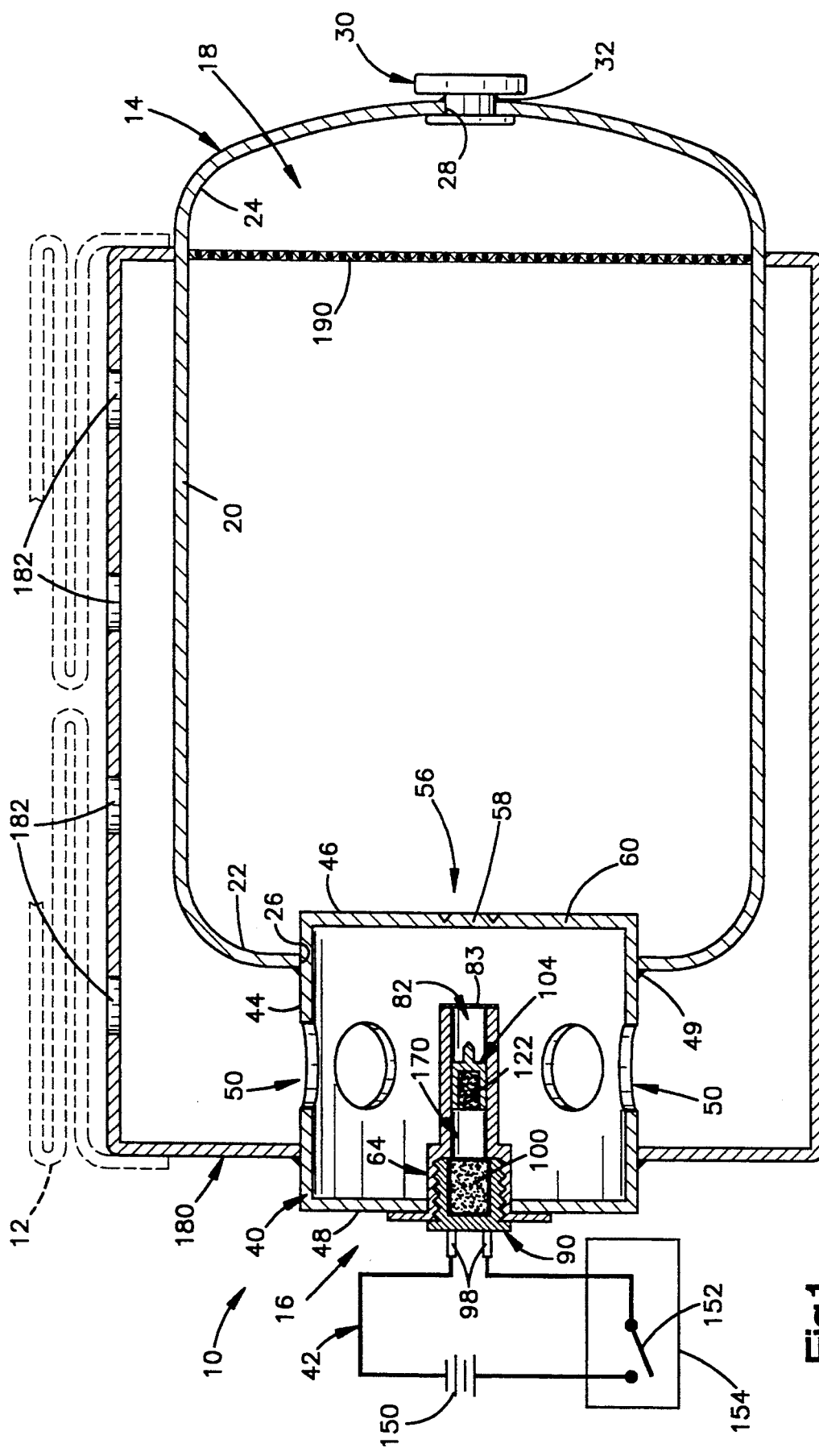
FIG. 1 is a schematic view of an inflator assembly in an unactuated condition and constructed in accordance with the present invention.

An inflator assembly 10 constructed in accordance with the present invention is shown schematically in FIG. 1. The inflator assembly 10 includes an inflatable vehicle occupant restraint 12, such as an air bag. The inflator assembly 10 has an unactuated condition shown in FIG. 1 in which the air bag 12 is stored in a folded condition. The inflator assembly 10 also has a fully actuated condition shown in FIG. 5 in which the air bag 12 is to be inflated. The inflator assembly 10 is actuated in response to vehicle deceleration of at least a predetermined magnitude, such as occurs in a vehicle collision. The air bag 12 is then inflated from the stored, folded condition to the fully inflated condition in which it restrains movement of a vehicle occupant and protects the vehicle occupant from forcibly striking parts of the vehicle.

The inflator assembly 10 further includes a storage container 14 and an actuating assembly 16. The storage container 14 has a sealed storage chamber 18 containing an inflation fluid, such as a gas, for inflating the air bag 12. The actuating assembly 16 opens the storage container 14 to release the gas from the storage chamber 18 upon the occurrence of vehicle deceleration of at least the predetermined magnitude.

The storage container 14 has a cylindrical side wall portion 20, a first end wall portion 22, and a second end wall portion 24. The first end wall portion 22 of the storage container 14 has an annular inner edge surface 26 defining an opening extending through the first end wall portion 22. The second end wall portion 24 of the storage container 14 has an annular inner edge surface 28 which similarly defines an opening extending through the second end wall portion 24. An end cap 30 is closely received through the opening in the second end wall portion 24. A weld 32 blocks leakage of the gas from the storage chamber 18 between the edge surface 28 and the end cap 30. The end cap 30 has a passage (not shown) through which the gas is conducted into the storage chamber 18. After the storage chamber 18 is filled with gas at a desired pressure, the passage in the end cap 30 is closed. The end cap 30 may also include a conventional pressure switch (not shown) which monitors the gas pressure in the storage chamber 18 to alert an occupant of the vehicle if the gas pressure drops below a predetermined level.

The gas in the storage chamber 18 is a combustible mixture of gases. The mixture of gases includes a fuel gas, an oxidizer gas for supporting combustion of the fuel gas, and an inert gas. The inert gas is preferably nitrogen, argon or a mixture of nitrogen and argon. The oxidizer gas is preferably oxygen. The fuel gas is preferably hydrogen, but may be methane, or a mixture of hydrogen and methane. Alternatively, the mixture of gases in the storage chamber 18 may be an oxidizer gas and a fuel gas in amounts which provide a very fuel lean mixture, i.e., the amount of oxidizer gas exceeds that amount required to support combustion of the fuel gas.

The mixture of gases in the storage chamber 18 readily combusts, when ignited, but otherwise is not explosive. As such, the mixture of gases could have many different compositions. The fuel gas may be 2 to 16 molar percent of the mixture of gases. The oxidizer gas may be 7 to 98 molar percent of the mixture of gases. The balance is inert gas which may be 0 to 91 molar percent of the mixture of gases. Preferably, the mixture of gases includes 10–14 molar percent hydrogen, 15–25 molar percent oxygen, and 61–75 molar percent inert gas. Most preferably, the mixture of gases includes 12.5 molar percent hydrogen and 20 molar percent oxygen, with the balance being nitrogen.

The mixture of gases in the storage container 14 is normally under pressure. The pressure depends upon such factors as the volume of the air bag 12 to be inflated, the time available for inflation, the inflation pressure desired, the volume of the storage chamber 18, and the percentage of each of the gases in the mixture of gases. Normally, the mixture of gases in the storage chamber 18 may be at a pressure of 500 to 5,000 pounds per square inch (psi). Preferably, the mixture of gases in the storage chamber 18 is at a pressure of 1,000 to 3,000 psi. However, the present invention is applicable to any mixture of gases regardless of pressure.

The actuating assembly 16 includes a manifold 40 and an electrical circuit 42. The manifold 40 has a cylindrical side wall 44, a first end wall 46, and a second end wall 48. The cylindrical side wall 44 of the manifold 40 is closely received through the opening in the first end wall portion 22 of the storage container 14. A weld 49 blocks leakage of the gas from the storage chamber 18 between the edge surface 26 and the cylindrical side wall 44.

The cylindrical side wall 44 of the manifold 40 further has a circumferentially extending array of gas flow openings 50. The first end wall 46 of the manifold 40 includes a circular metal closure 56. The closure 56 has a flat predefined break away central portion 58 and a flat annular rim portion 60.

Figure 2:
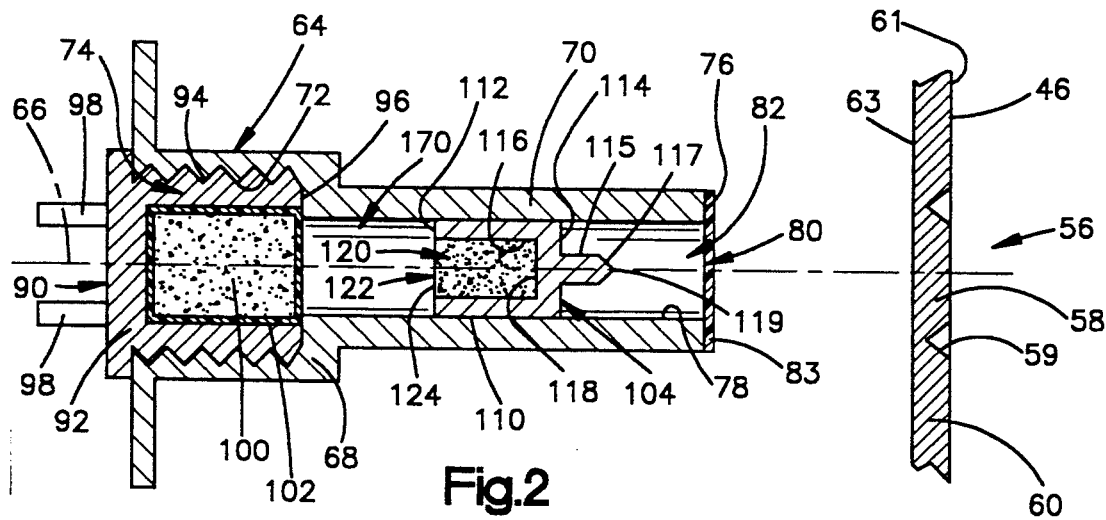
FIG. 2 is an enlarged view of parts of the inflator assembly of FIG. 1.

As shown in enlarged detail in FIG. 2, the closure 56 has a first major side surface 61 and a second major side surface 63 which faces toward the actuating assembly 16. A ring-shaped V-groove 59 is formed on the first major side surface 61. The ring-shaped V-groove 59 acts as a stress riser in the material of the closure 56 which interconnects the break away central portion 58 and the annular rim portion 60. The ring-shaped V-groove 59 is a ring-shaped boundary at which the break away central portion 58 of the closure 56 may break away.

An actuator housing 64 also is supported in the manifold 40. The actuator housing 64 is a tubular member with a longitudinal central axis 66. The actuator housing 64 has a base portion 68 and a guide portion 70. The base portion 68 has a threaded inner surface 72 which defines a cylindrical base compartment 74. The guide portion 70 has an annular end surface 76 and a smooth cylindrical inner surface 78. The annular end surface 76 defines a circular opening 80. The smooth cylindrical inner surface 78 defines a guide passage 82 extending axially through the guide portion 70 from the base compartment 74 to the opening 80. A suitable piece of tape 83 is adhesively connected to the annular end surface 76 to cover and seal the opening 80.

As further shown in enlarged detail in FIG. 2, a squib 90 is supported within the actuator housing 64. The squib 90 includes a cylindrical casing 92. The casing 92 has a threaded outer surface 94, and has an annular front end surface 96 defining an opening at the front end of the squib 90. A pair of electrically conductive pins 98 extend into the casing 92. The casing 92 contains a pyrotechnic charge 100 in an envelope 102 which is hermetically sealed. The pyrotechnic charge 100 is ignited upon the passage of electric current through the squib 90 between the pins 98. The pyrotechnic charge 100 is preferably $ZrKClO_4$, but other known pyrotechnic charge materials can be used in the squib 90. When the pyrotechnic charge 100 in the squib 90 is ignited, it produces combustion products which rupture the envelope 102 to open the hermetic seal and emerge through the opening at the front end of the squib 90.

The casing 92 is screwed into the base compartment 74 of the actuator housing 64 with the opening at the front end surface 96 facing the guide passage 82. The squib 90 is thus supported by the actuator housing 64 in a position to direct the combustion products from the pyrotechnic charge 100 into the guide passage 82 in a direction extending along the axis 66.

Also, as shown in FIG. 2, a movable container 104 in the form of a projectile member has a cylindrical side surface 110, an annular rear end surface 112, and an annular front end surface 114. The movable container 104 also includes a cylindrical side surface 115 having a diameter smaller than the diameter of the cylindrical side surface 110. The cylindrical side surface 115 extends perpendicularly away from the annular front end surface 114 and is concentric with the cylindrical side surface 110. A conical front end surface 117 extends away from the cylindrical side surface 115 to form a pointed tip portion 119 of the movable container 104.

The movable container 104 further has a cylindrical inner surface 116 and a circular inner surface 118. The inner surfaces 116, 118 are coaxial with the outer side surface 110, and together define a compartment 120 within the movable container 104. The compartment 120 has a cylindrical shape, with an open end at the annular rear end surface 112 and a closed end at the circular inner surface 118.

An ignitable material 122 is contained within the compartment 120 in the movable container 104. In the embodiment of the invention shown in the drawings, the ignitable material 122 fills the compartment 120 and has an exposed surface 124 extending across the open end of the compartment 120. The ignitable material 122 is preferably $BKNO_3$, but, as with the pyrotechnic charge 100, other known materials can be used as alternatives.

While the surface 124 is referred to herein as an exposed surface, the ignitable material 122 (like the ignitable material 100) preferably is protected from environmental conditions such as moisture. Such protection could be accomplished by a cap or a cover in the nature of a shell or possibly a wax coating (none of which are shown on the drawings).

When the inflator assembly 10 is in the unactuated condition shown in FIG. 1, the movable container 104 is located within the actuator housing 64. Specifically, the movable container 104 has an unactuated position in which it is closely received coaxially within the guide passage 82 in the guide portion 70 of the actuator housing 64. When the movable container 104 is located in its unactuated position, the cylindrical outer side surface 110 of the movable container 104 is closely received against the cylindrical inner surface 78 of the guide portion 70 with a releasable interference fit. The interference fit can be supplemented with a crimp in the guide portion 70 of the actuator housing 64, or with a shear pin or the like. Additionally, the exposed surface 124 of the ignitable material 122 faces axially toward the opening at the front end surface 96 of the squib 90.

As noted above, the actuating assembly 16 further includes an electrical circuit 42. The electrical circuit 42 includes a power source 150, which is preferably the vehicle battery and/or a capacitor, and a normally open switch 152. The switch 152 is preferably part of a vehicle deceleration sensor 154. The deceleration sensor 154 senses vehicle deceleration which is indicative of a collision, and closes the switch 152 in response to such vehicle deceleration. Such a deceleration sensor is known in the art. The electrical circuit 42 extends through the squib 90 between the pins 98, and actuates the squib 90 when the switch 152 is closed.

When the vehicle experiences a collision, the deceleration sensor 154 senses the deceleration of the vehicle that is caused by the collision and closes the switch 152. When the switch 152 is closed, electric current passes through the squib 90 between the pins 98. The pyrotechnic charge 100 in the squib 90 is then ignited, and produces combustion products which rupture the envelope 102 and emerge from the squib 90. The combustion products emerging from the squib 90 move into a space 170 in the guide passage 82 between the squib 90 and the movable container 104, and move axially across the space 170 to the movable container 104. When the combustion products from the squib 90 reach the movable container 104, they ignite the ignitable material 122 in the movable container 104 at the surface 124 of the ignitable material 122. The ignitable material 122 then produces combustion products which are emitted from the open end of the compartment 120 and directed into the space 170. Any environmental protection over the surface 124 is destroyed.

When the pyrotechnic charge 100 and the ignitable material 122 are burning, the combustion products are initially contained in the space 170 between the squib 90 and the movable container 104. The gaseous components of the combustion products in the space 170 increase in pressure as the pyrotechnic charge 100 and the ignitable material 122 burn. The squib 90 is securely held in the base compartment 74 by the engaged threads. However, the movable container 104 is releasably held in the guide passage 82 by the interference fit.

When the increasing gas pressure in the space 170 reaches a predetermined elevated level, the force of the gas pressure acting axially against the movable container 104 becomes great enough to overcome the interference fit. The force of the gas pressure then propels the movable container 104 at a relatively high velocity from its unactuated position and out of the guide passage 82 in the actuator housing 64 toward the closure 56. The movable container 104 comprises a mass having an amount of kinetic energy when the movable container 104 is propelled at the relatively high velocity.

Figure 3:
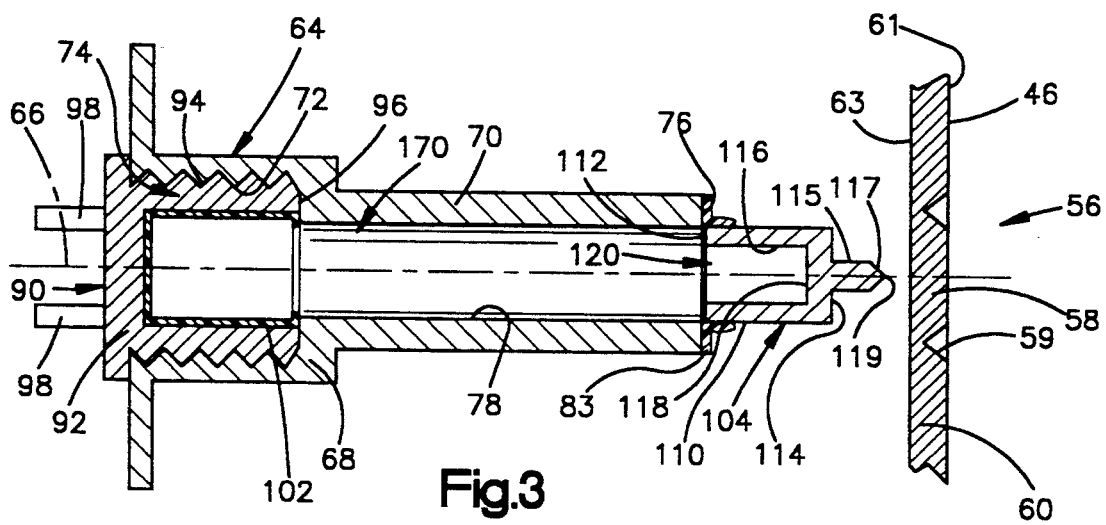
FIG. 3 is a view similar to FIG. 2 but showing the inflator assembly in a partially actuated condition.
Figure 4:
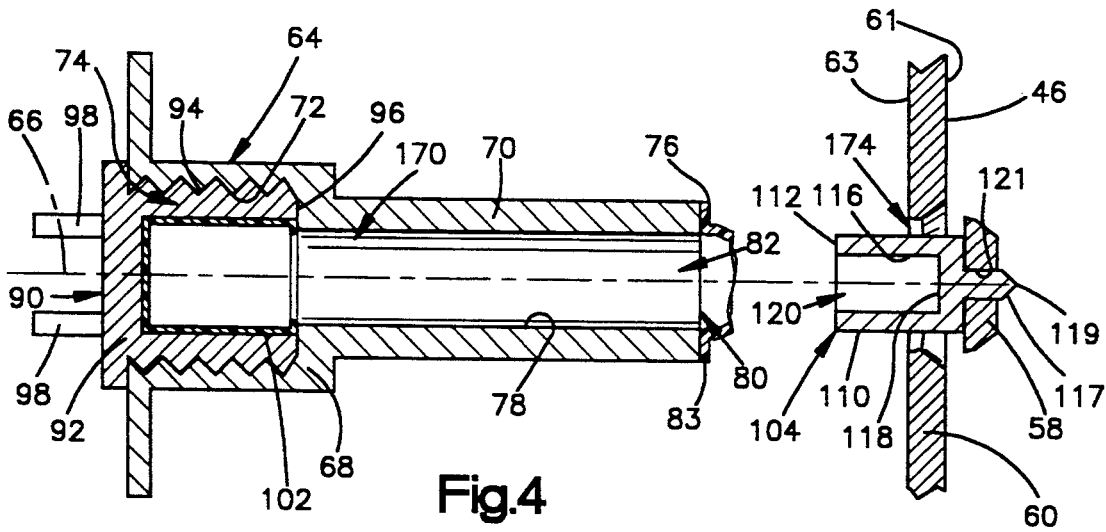
FIG. 4 is a view similar to FIG. 3 but showing the inflator assembly in another partially actuated condition.

The kinetic energy of the movable container 104 is sufficient to allow the movable container 104 to puncture the tape 83 and move through the tape 83 towards the closure 56. When the pointed tip portion 119 of the movable container 104 reaches the second major side surface 63 of the closure 56, as shown in FIG. 3, the pointed tip portion 119 begins to penetrate the break away central portion 58. The pointed tip portion 119 continues to penetrate the break away central portion 58 until a penetration hole 121 is created in the break away central portion 58, as shown in FIG. 4. As the pointed tip portion 119 penetrates the break away central portion 58, the cylindrical side surface 115 and the conical front end surface 117 frictionally engage the material of the break away central portion 58. The frictional engagement between the material of the break away central portion 58 and the two surfaces 115, 117 is strong enough and the mass of the movable container 104 is moving forcefully enough such that the kinetic energy of the mass is sufficient to break the break away central portion 58 away from the annular rim portion 60 at the ring-shaped V-groove 59, also as shown in FIG. 4.

It is conceivable that the front end surface 114 may abuttingly engage the break away central portion 58 during penetration of the pointed tip portion 119 into the break away central portion 58. Whether or not this will occur depends upon a number of factors. For example, if the ring-shaped V-groove 59 is shallow, or the pointed tip portion 119 is of a small diameter, and/or materials are properly selected (pointed tip portion 119 much harder than the break away central portion 58), the front end surface 114 may engage the break away central portion 58 to assist in allowing the kinetic energy of the mass of the movable container 104 to break the break away central portion 58. However, if the ring-shaped groove 59 is very deep, and/or the pointed tip portion 119 is of a large diameter, the front end surface 114 may not engage the break away central portion 58.

It is also conceivable that the pointed tip portion 119 may have a different structure than that as shown in FIGS. 1–5. For example, it is possible to have a pointed tip portion shaped like an arrowhead (not shown) in which case the wing-like portions of the arrowhead would deform during penetration into the break away central portion 58. After the arrowhead completely penetrates the break away central portion 58, the wing-like portions of the arrowhead would then expand back toward their original shape. The break away central portion 58 would thereby be trapped between the front end surface 114 of the movable container 104 and the wing-like portions of the arrowhead.

When the break away central portion 58 breaks away from the annular rim portion 60, as shown in FIG. 4, a hole 174 is created in the closure 56. The hole 174 is a gas exit opening. The movable container 104 thus opens the storage container 14 to release the mixture of gases from the storage chamber 18. The mixture of gases then flows outward through the gas exit opening 174, and further through the manifold 40 to the gas flow openings 50. A diffuser 180 with a plurality of gas exit openings 182 then directs the gas to flow from the manifold 40 to the air bag 12.

Figure 5:
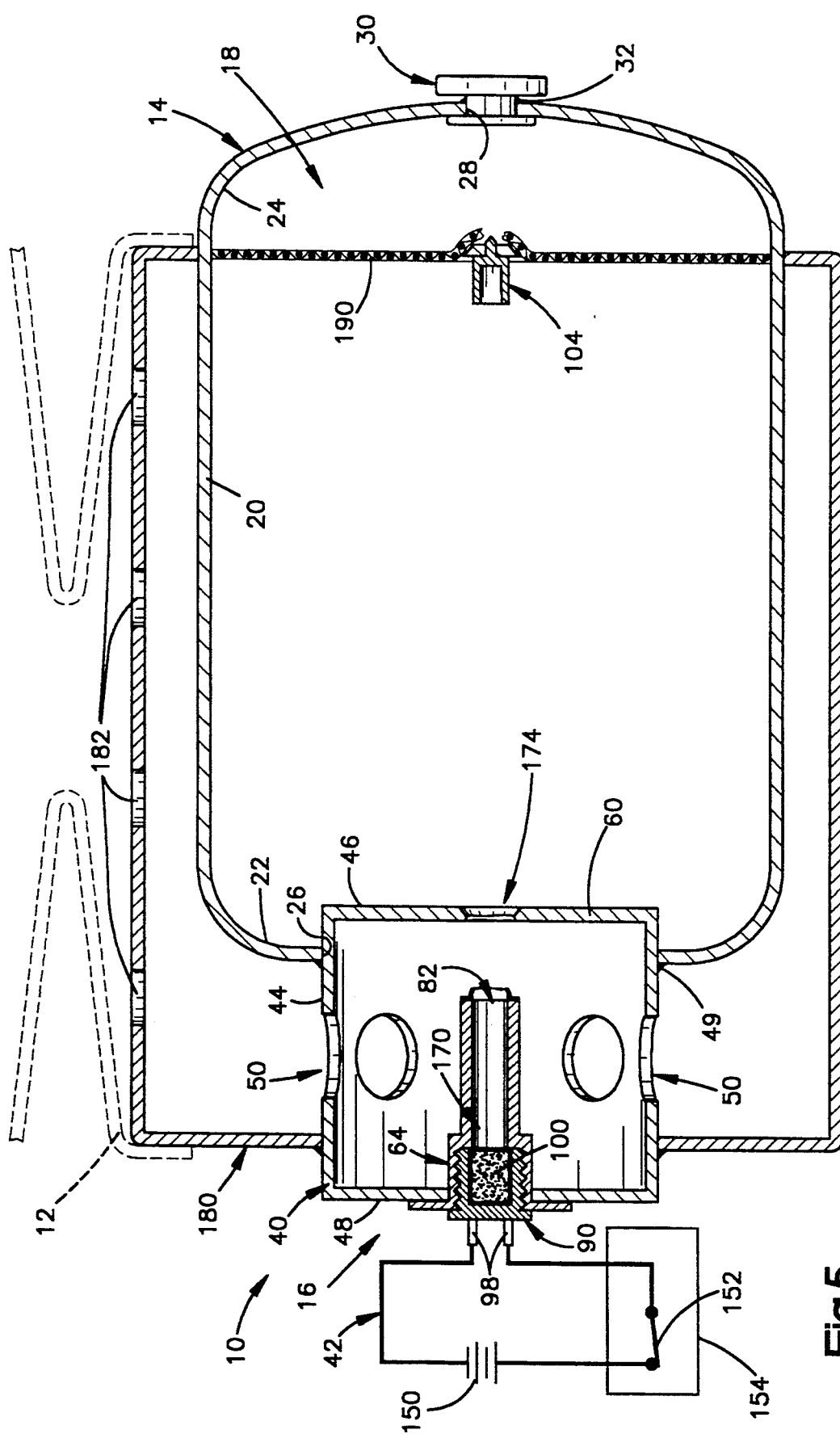
FIG. 5 is a view similar to FIG. 1 but showing the inflator assembly in a fully actuated condition.

After the penetration hole 121 is created in the break away central portion 58 and the break away central portion 58 is broken away from the annular rim portion 60, the movable container 104 and the break away central portion 58 together continue to move to the right, as viewed in FIG. 5, into the storage chamber 18 in the storage container 14. The movable container 104 thus carries the break away central portion 58 and the ignitable material 122 into the mixture of gases in the storage chamber 18 when the ignitable material 122 is burning. The combustion products generated by the ignitable material 122 include heat, hot particles and hot gases. These combustion products continue to be emitted from the compartment 120 in the movable container 104 as the movable container 104 moves through the mixture of gases, and are thus dispersed in the mixture of gases sufficiently to ignite the fuel gas substantially uniformly and rapidly throughout the storage chamber 18.

When the fuel gas burns in the mixture of gases, it generates heat and gaseous products of combustion which increase the temperature and pressure of the mixture of gases. The pressurized mixture of gases rushes outward through the gas exit opening 174 past the closure 56 and into the air bag 12. As in the inflator assembly disclosed in the co-pending application noted above, the fuel gas is consumed before it reaches the gas exit openings 182 in the diffuser 180. The air bag 12 is thus inflated quickly to its fully inflated condition by the gas which is pressurized upon burning of the fuel gas in the mixture of gases.

The operation of the inflator assembly 10 can be controlled in a number of ways. For example, the amounts and compositions of the pyrotechnic charge 100 in the squib 90 and the ignitable material 122 in the movable container 104 are variables which determine the rate at which the pressure will increase in the space 170 between the squib 90 and the movable container 104. The rate at which the pressure increases in the space 170 will affect the time at which and the speed with which the movable container 104 enters the storage chamber 18. The speed with which the movable container 104 moves through the mixture of gases, and the amount of the ignitable material 122 which continues to burn as the movable container 104 moves through the mixture of gases will, in turn, affect the amount of and rate at which the combustion products are dispersed in the mixture of gases to ignite the fuel gas.

In the preferred embodiment of the invention, the movable container 104 is cast through the storage chamber 18 from the gas exit opening 174 to the second end wall portion 24 of the container 14. The second ignitable material 122 continues to spew combustion products into the mixture of gases at least until the movable container 104 reaches a screen 190 located at the far end of the storage chamber 18 adjacent the second end wall portion 24, as shown in FIG. 5. This ensures that the fuel gas is ignited uniformly. The screen 190 is punctured by the movable container 104, and captures the movable container 104 at the far end of the storage cheer 18. When the screen 190 captures the movable container 104, the break away central portion 58 is trapped between the screen 190 and the movable container 104.

From the foregoing description of the invention, those skilled in the art to which the present invention relates will perceive improvements, changes and modifications. Such improvements, changes and modifications within the skill of the art to which the present invention relates are intended to be covered by the appended claims.

Having described the invention, the following is claimed:

1. An inflator assembly for inflating an inflatable vehicle occupant restraint, said inflator assembly comprising:

a source of inflation fluid for inflating the vehicle occupant restraint;

means for directing inflation fluid into the vehicle occupant restraint;

a closure located to block inflation fluid flow through said directing means, said closure including a predefined break away portion which, when broken away, enables inflation fluid flow through said directing means;

a projectile member for breaking away said break away portion of said closure to enable inflation fluid flow through said directing means; and means for propelling said projectile member from a first position in which said closure is located to block inflation fluid flow through said directing means to a second position in which said break away portion of said closure is broken away to enable inflation fluid flow through said directing means;

said projectile member comprising (i) a mass having kinetic energy when said projectile member is propelled, (ii) a tip for penetrating said break away portion of said closure, and (iii) surface means for engaging the material of said break away portion of said closure as said tip penetrates said break away portion to enable the kinetic energy associated with said mass to break away said break away portion and then to carry away said break away portion, thereby to enable inflation fluid flow through said directing means.

2. An inflator assembly as defined in claim 1 wherein said break away portion of said closure has a boundary at which said break away portion breaks away when said surface means engages said break away portion and the kinetic energy associated with the mass is sufficient to break away said break away portion.

3. An inflator assembly according to claim 1 wherein said projectile member includes means defining a compartment within said projectile member and wherein said means for propelling said projectile member includes an ignitable material contained in said compartment of said projectile member.

4. An inflator assembly according to claim 1 further including a screen to trap said break away portion of said closure and said projectile member after said break away portion is carried away.

5. An inflator assembly according to claim 1 wherein said break away portion has a boundary at which said break away portion breaks away, said boundary including means defining a ring-shaped groove formed around the outer periphery of said break away portion.

6. An inflator assembly according to claim 1 wherein said surface means includes a surface which frictionally engages the material of said break away portion of said closure as said tip penetrates said break away portion to enable the kinetic energy associated with said mass to break away said break away portion and then to carry away said break away portion.

7. An inflator assembly according to claim 1 wherein said surface means includes a surface which abuttingly engages the material of said break away portion of said closure after said tip penetrates said break away portion to enable the kinetic energy associated with said mass to break away said break away portion and then to carry away said break away portion.

8. An inflator assembly according to claim 1 wherein said surface means includes (i) a first surface which engages the material of said break away portion of said closure as said tip penetrates said break away portion, and (ii) a second surface which extends transverse to said first surface and which abuttingly engages the material of said break away portion, thereby to enable the kinetic energy associated with said mass to break away said break away portion and then to carry away said break away portion.

9. An inflator assembly for use in inflating a vehicle occupant restraint, said inflator assembly comprising:

means for defining a storage chamber for (a) storing gas which is releasable to inflate the vehicle occupant restraint and (b) containing a first ignitable material which produces first combustion products to pressurize and supplement the stored gas, said means for defining including a predefined break away wall portion having a boundary at which said break away wall portion can break away;

actuator means for igniting the first ignitable material, said actuator means including supporting means for supporting a second ignitable material which produces second combustion products to ignite the first ignitable material, said supporting means comprising a movable container in which said second ignitable material is contained;

said actuator means further including moving means for propelling said movable container against said break away wall portion to penetrate and break away said break away wall portion and then to carry away said break away wall portion across said storage chamber when said second ignitable material is burning.

10. An inflator assembly as defined in claim 9 wherein said first ignitable material is a combustible fuel gas contained within said storage chamber.

11. An inflator assembly as defined in claim 9 wherein said movable container has an opening to the exterior of said movable container through which combustion products from ignition of said second ignitable material flow.

12. An inflator assembly as defined in claim 9 wherein said moving means supports said movable container at a location outside of said storage chamber, said moving means being responsive to an actuating signal to propel said movable container toward said break away wall portion.

13. An inflator assembly as defined in claim 12 wherein said moving means propels said movable container toward said break away wall portion to penetrate and break away said break away wall portion at said boundary in response to said actuating signal.

14. An inflator assembly as defined in claim 13 wherein said igniter means further includes means for generating said actuating signal in response to vehicle deceleration.

15. An inflator assembly as defined in claim 9 wherein said break away wall portion has a boundary at which said break away wall portion breaks away, said boundary including means defining a ring-shaped groove formed around the outer periphery of said break away wall.

* * * * *